United States Patent [19]

Kovens et al.

[11] 4,187,496

[45] Feb. 5, 1980

[54] KEYLESS VEHICLE INTRUSION ALARM

[75] Inventors: Michael L. Kovens, Randallstown; Henry H. Hoge, Baltimore, both of Md.

[73] Assignee: Universal Security Instruments, Inc.

[21] Appl. No.: 859,975

[22] Filed: Dec. 12, 1977

[51] Int. Cl.² ............................................. B60R 25/10
[52] U.S. Cl. ................................ 340/63; 307/10 AT; 180/286
[58] Field of Search ............................ 340/63, 64, 65; 307/10 AT; 180/114

[56] References Cited

U.S. PATENT DOCUMENTS

| | | | |
|---|---|---|---|
| 3,781,854 | 12/1973 | Kaufman et al. | 340/64 |
| 3,967,239 | 6/1976 | Steele | 340/63 |
| 4,016,537 | 4/1977 | Ray | 340/64 |

Primary Examiner—Alvin H. Waring
Attorney, Agent, or Firm—Rose & Edell

[57] ABSTRACT

A keyless vehicle intrusion alarm is armed by momentary depression of the brake pedal or actuation of some other electrically-responsive circuit, followed by the opening and closing of a particular vehicle door within a first predetermined time period. In order to signal the operator that an arming sequence has been initiated, a short burst of the alarm is sounded after the brake pedal or other electric circuit is momentarily activated. Subsequent reentry via that door initiates a time delay during which the entrant must actuate the ignition switch to prevent an alarm from sounding. Entry through any other door, or tampering with the vehicle hood, results in immediate sounding of the alarm. The alarm sounds for a limited time interval before being automatically squelched.

7 Claims, 1 Drawing Figure

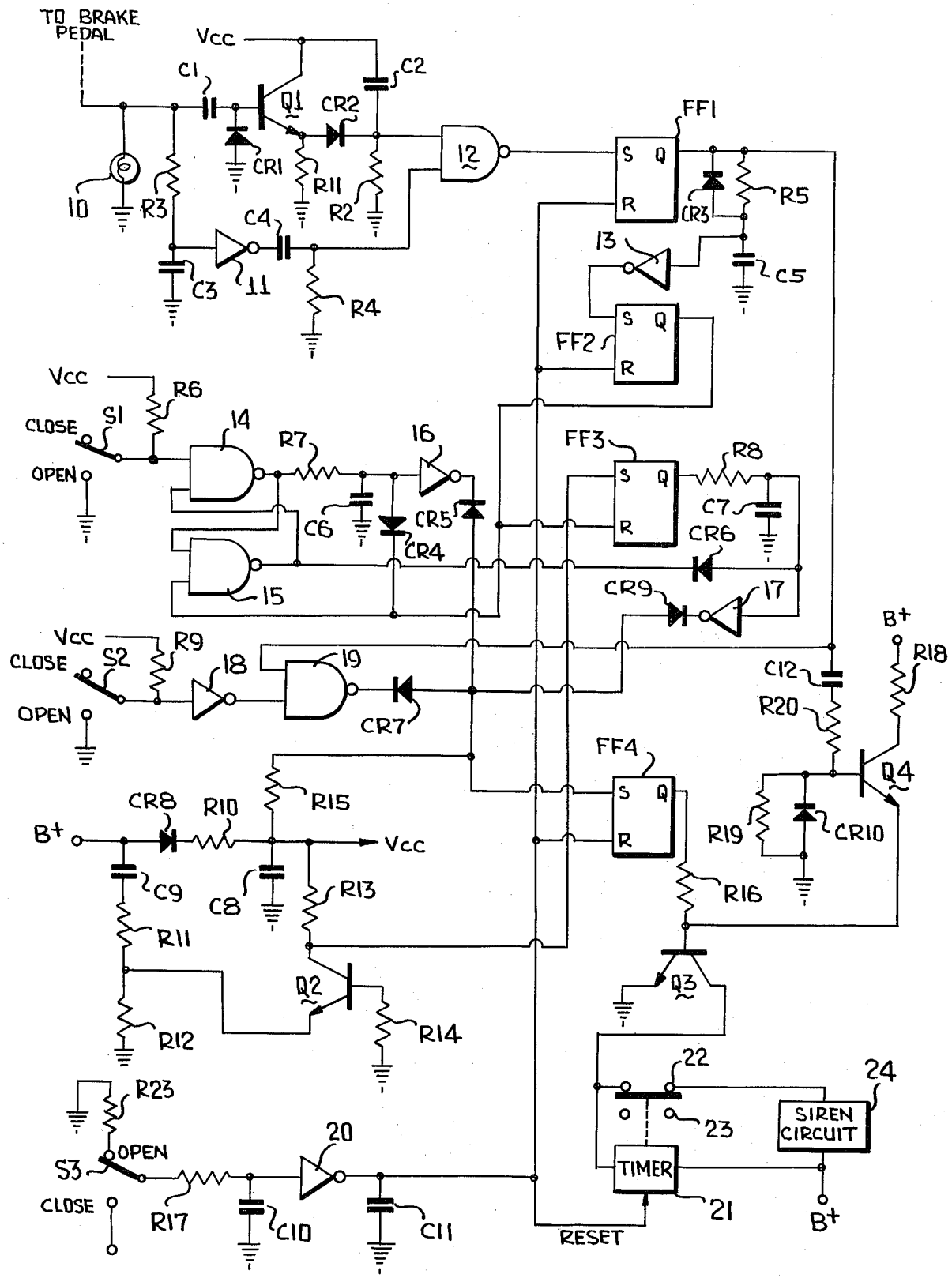

KEYLESS VEHICLE INTRUSION ALARM

BACKGROUND OF THE INVENTION

The present invention relates to vehicle intrusion alarms and, more particularly, to an improved vehicle alarm which is easily armed and difficult to foil.

Prior art vehicle intrusion alarms have been characterized by arming sequences which involve multiple steps which are often not properly followed by vehicle operators. Even when the sequence is properly followed, the operator is never quite sure that the alarm system is armed and can only find out by entering the vehicle and tripping the alarm; of course, he must thereafter re-arm the system and once again be unsure that it is armed. Moreover, where attempts have been made to simplify the arming procedure, the resulting alarm system is generally easily foiled by an intruder.

It is an object of the present invention to provide a vehicle alarm system which is easily armed, difficult to foil, and which provides an indication to the operator when it is armed.

It is conventional in vehicle intrusion alarm systems to provide a delay between the time an intrusion is sensed and the sounding of an alarm. This delay, normally on the order of sixty seconds or so, permits the operator of the vehicle to enter the vehicle and disarm the alarm system without setting off the alarm. An intruder can easily enter the vehicle, steal contents therefrom, and be gone within this delay period.

It is therefore another object of the present invention to provide a vehicle intrusion alarm system in which there is no delay between most sensed intrusions and alarm actuation and yet which permits the vehicle operator sufficient time to enter the vehicle and disarm the alarm.

In prior art vehicle intrusion alarm systems a severe problem arises once the alarm is actuated in that the alarm continues to sound until it is disarmed by the operator. The result is annoying noise pollution and needless drain on the vehicle battery, for it is only necessary, for alarm purposes, to sound the alarm for a few minutes.

It is a further object of the present invention to provide a vehicle intrusion alarm system in which the alarm is automatically terminated a pre-determined time after actuation.

SUMMARY OF THE INVENTION

In accordance with the present invention, a vehicle intrusion alarm system is armed by momentary actuation of one of the electrical circuits in the vehicle (e.g. headlamps, brake pedal, windshield wiper, etc.). Immediately upon actuation of this circuit a short burst of the alarm is sounded as an indication to the operator that the alarm is armed. The operator then has a predetermined time to leave the vehicle without triggering the alarm. After that predetermined time, the opening of any vehicle door, except the driver's door, triggers the alarm. The hood is considered differently in that opening of the hood any time after arming (i.e. without the predetermined time delay) sounds the alarm; this permits the operator to be immediately notified if the hood has inadvertently been left ajar. Opening the driver's door establishes a second predetermined time delay (e.g. on the order of fifteen to twenty seconds) during which the vehicle operator must turn the vehicle ignition switch to its ON position to prevent the alarm from sounding. The alarm, when actuated, remains actuated for still another predetermined time interval (e.g. on the order of two minutes) after which it is automatically de-actuated.

BRIEF DESCRIPTION OF THE DRAWING

The above and still further objects, features and advantages of the present invention will become apparent upon consideration of the following detailed description of one specific embodiment thereof, especially when taken in conjunction with the accompanying drawing, wherein:

The FIGURE is an electrical schematic diagram of alarm circuit of the present invention.

DESCRIPTION OF THE PREFERRED EMBODIMENTS

Referring specifically to the drawing, the alarm circuit according to the present invention includes an arming circuit shown in the upper left corner of the FIGURE. Specifically, the arming circuit is connected across one of the brake lights 10 of a vehicle. The arming circuit includes a capacitor C1 connected between the high voltage side of the brake light 10 and the base of NPN transistor Q1. A diode CR1 has its cathode connected to the base of Q and its anode connected to ground and prevents the base from going negative. The collector of Q1 is connected to filtered supply voltage Vcc which is derived from the vehicle battery voltage in manner described below. A resistor R1 is connected between the emitter of Q1 and ground. A series circuit comprising capacitor C2 and resistor R2 is connected between the collector of Q1 and ground. A diode CR2 has its anode connected to the emitter of Q1 and its cathode connected to the junction between capacitor C2 and resistor R2; the latter junction is also connected as one input of a two-input NAND gate 12. A series circuit comprising resistor R3 and capacitor C3 is connected across brake light 10 and an input signal to inverter 11 is derived from the junction between R3 and C3. The output terminal of inverter 11 is coupled to ground through capacitor C4 and resistor R4. The junction between C4 and R4 is connected as the second input signal to NAND gate 12.

The output signal from NAND gate 12 supplies the S (set) input for arming initiation flip flop FF1, the Q output of which feeds an RC timer comprising resistor R5 and capacitor C5 connected in series between the Q output terminal and ground. A clamping diode CR3 is connected to the Q terminal of FF1. A differentiator including series-connected capacitor C12 and Resistor R20 is connected between the Q terminal of FF1 and the base of NPN transistor Q4. A resistor R19 and diode CR10 are connected in parallel between the base of Q4 and ground, the anode of CR10 being grounded. The collector of Q4 is resistively coupled to the vehicle pattern voltage B+ through resistor R18. The emitter of Q4 is directly connected to the base of NPN transistor Q3.

The junction between R5 and C5 is connected to the input terminal of inverter 13 which feeds the S (set) input terminal of arming complete flip flop FF2. The Q output of FF2 is connected to the R (reset) input of intrusion sensing flip flop FF3 and to one input terminal of a two-input NAND gate 15 at the driver's door circuit. NAND gate 15 is connected with two-input NAND gate 14 to form a bistable circuit and, to this end, the other input of NAND gate 15 is coupled to the output terminal of NAND gate 14 whereas the output terminal of NAND gate 15 is connected to one input terminal of NAND gate 14. The other input of NAND gate 14 serves as the set input terminal for the bistable circuit and is connected to the arm of switch S1 which is in its CLOSE position when the driver's door is closed and in its OPEN position when the driver's door is open. S1 is a separate switch, installed as part of the alarm system, and is in addition to the usual door switch which operates the vehicle dome light. The CLOSE contact of S1 is open-circuited; the OPEN contact of S1 is connected to ground. A resistor R6 resistively couples the filtered supply voltage Vcc to the same set input terminal of NAND gate 14. An RC timer circuit includes series connected resistor R7 and capacitor C6 connected between the output terminal of NAND gate 14 and ground. The junction between R7 and C6 is connected to the input terminal of inverter 16 and the anode of diode CR4, the cathode of which is connected to the first-mentioned input terminal of NAND gate 15. The output signal from inverter 16 is connected to the cathode of diode CR5, the anode of which is connected to the S (set) input of alarm flip flop FF4.

The Q output terminal of FF3 feeds a transient suppressing RC timer comprising resistor R8 and capacitor C7 connected in series to ground. The junction between R8 and C7 is connected to the anode of diode CR6, the cathode of which is connected to the first-mentioned input of NAND gate 14. In addition, the junction of R8 and C7 is connected to an inverter 17 which feeds the cathode of diode CR9, the anode of which is connected to the S terminal of FF4.

A hood tamper sensing circuit includes a hood tamper switch S2 which provides an open circuit in its CLOSE position (hood closed) and a grounded circuit when in its OPEN position (hood ajar). The arm of switch S2 is connected to the input of inverter 18 along with filtered supply voltage Vcc which is resistively coupled via R9. Inverter 18 feeds a two-input NAND gate 19, the other input of which is derived from the Q output of FF1. The output terminal of NAND gate 19 is connected to the cathode of diode CR7, the anode of which is connected to the S terminal of FF4. The S terminal of FF4 is also coupled to the filtered supply voltage Vcc via resistor R15.

The filtered supply voltage Vcc is derived from the vehicle battery voltage B+ by means of diode CR8, resistor R10 and capacitor C8 connected in series between B+ and ground. The filtered Vcc voltage is taken from the junction between R10 and C8.

An intrusion sensing circuit includes a capacitor C9, resistively coupled to ground via series-connected resistors R11 and R12. The junction of R11 and R12 is connected to the emitter of NPN transistor Q2, the base of which is resistively coupled to ground by R14. The collector of Q2 is coupled to filtered supply voltage Vcc through resistor R13.

A reset circuit includes a pole of the ignition switch S3 for the vehicle which has OPEN and CLOSE positions. In the CLOSE position (i.e. corresponding to IGN of the vehicle ignition switch) the arm of S3 is connected directly to the battery voltage B+. In the OPEN position (i.e. corresponding to all other positions of the vehicle ignition switch) the arm of S3 is resistively coupled to ground through R23. The arm of S3 is permanently connected to one end of resistors R17 and R23; the other end of R17 is capacitively coupled to ground through C10 and directly coupled to the input terminal of inverter 20. The output terminal of inverter 20 is capacitively coupled to ground via C11 and is directly connected to the R (reset) input terminals of FF1, FF2 and FF4.

The alarm circuit itself includes NPN transistor Q3, the base of which is resistively coupled to the Q output of FF4 and directly connected to the emitter of Q4. The emitter of Q3 is grounded. The collector of Q3 is connected to one of the normally closed contact pair 22 of a timer 21. The other of the normally closed contacts is connected in series with siren circuit 24 and the battery voltage B+. The normally open contacts of timer 21 are open-circuited. The collector of Q3 is also connected in series with timer 21 and the battery voltage B+. Timer 21 is of the conventional relay type in which the armature pulls in (i.e. to the normally open contacts) after the timer has been energized for a predetermined time. For present purposes the predetermined time is nominally two minutes.

In operation, when the ignition switch S3 is placed in its CLOSE position (i.e.—the vehicle is started and operating), capacitor C10 charges through resistor R17 to the battery voltage level, thereby providing a positive-going transition at the input to inverter 20. The resulting negative-going transition at the output of inverter 20 resets timer 21 and flip flops FF1, FF2 and FF4. When the vehicle engine is turned off switch S3 is moved to its OPEN position, permitting capacitor C10 to discharge via resistors R17 and R23. The operator can arm the alarm system by stepping on the brake momentarily (i.e.—for a period of approximately five seconds or less). This applies a positive voltage across brake lamp 10 which drives transistor Q1 into conduction. Capacitor C2, which is initially charged to a level of +Vcc volts, discharges through the collector-emitter circuit of Q1. The voltage level at the top input to NAND gate 12 therefore begins to drop as the capacitor recharges. Before the brake pedal is depressed, Gate 12 is initially enabled (i.e. high output) because the voltage across R2 and R4 at the two gate inputs are low. Contemporaneously with discharge of C2, the voltage across brake lamp 10 quickly charges capacitor C3 via resistor R3 so that a high level appears at the input to inverter 11 and a low level appears at its output. This low level applied to the second input terminal of NAND gate 12 keeps that gate enabled. If the operator deactivates the brake pedal, capacitor C3 quickly discharges through resistor R3 and lamp 10, driving the input to inverter 11 low and its output high. If this occurs before capacitor C2 discharges to below the threshold level for gate 12, both inputs to gate 12 are simultaneously high and the gate is disabled. The resulting negative-going transition at the output of gate 12 sets the arming flip flop FF1. If, on the other hand, the operator actuates the brake pedal for a long enough time to permit capacitor C2 to charge below the threshold of gate 12, de-actuation of the brake pedal does not produce two simultaneously high inputs to gate 12, so that the gate remains enabled and FF1 is not set. It is to be understood that brake lamp 10 is intended to be only representative of any electrical appliance in the vehicle which can be momentarily actuated to arm the alarm system. For example, the head lamps, windshield wiper, radio, heater fan, etc., may all serve the same purpose, provided they may be actuated when the ignition switch is off. Typically, the momentary actuation of the appliance is on the order of five seconds or less to effect arming.

When the arming flip flop FF1 is set its Q output terminal goes high, resulting in a positive impulse being passed through differentiating circuit C12, R20 to momentarily gate transistor Q4 into conduction. This applies a momentary positive voltage at the base of Q3 which is gated on momentarily to provide a current pulse through the siren circuit via timer contacts 22. The current pulse causes the siren circuit to emit a short burst (i.e. on the order of a fraction of a second) to indicate to the operator that the alarm circuit has been armed.

The only other means for sounding the siren alarm is by setting flip flop FF4 which, when set, also gates on transistor Q3 with a high signal level. FF4, however, was initially reset from ignition switch S3 and is normally maintained reset because a high level (Vcc) is maintained at its S input terminal via resistor R15. If any of diodes CR5, CR7 or CR9 are rendered conductive, the voltage at the S input terminal of FF4 drops and FF4 is set. The manner in which diodes CR5, CR7 or CR9 are rendered conductive is described in the following paragraphs.

CR7 is controlled by two-input NAND gate 19 which renders CR7 conductive only when both of its input signals are high. Prior to setting of flip flop FF1 the top input of NAND gate 19 is low so that CR7 cannot be rendered conductive before FF1 is set. The other input for NAND gate 19 comes from the hood switch S2 via inverter 18. If the hood is closed a high level appears at the input to inverter 18 and a low level appears at its output. This low level keeps the output of NAND gate 19 high, regardless of the state of FF1. If the hood is ajar, the input to inverter 18 is grounded, rendering the output of the inverter high. Thus, when FF1 is set and the hood is ajar, diode CR7 is rendered conductive and FF4 is set to sound the alarm. It is to be noted that there is no delay after FF1 is set before an open hood condition causes the alarm to sound.

Diode CR5 is controlled by inverter 16 which, in turn, is controlled by NAND gate 14. Before flip flop FF1 is set, flip flop FF2 is reset so that the Q signal from FF2 is low and the output from NAND gate 15 is high; this forces one input to NAND gate 14 high. Assuming the driver's door to be closed, S1 is in the CLOSE position and a high level also appears on the other input to NAND gate 14. With both inputs high, the output from NAND gate 14 is low and the output of inverter 16 is high to prevent diode CR5 from conducting. If the driver's door is ajar, still assuming that FF1 is reset, the top input to NAND gate 14 goes low, thereby driving the output of gate 14 high. However, this high level is not reflected at the input to inverter 16 because diode CR4 clamps the inverter input to the low level appearing at the Q output terminal of FF2. Thus, the alarm does not sound when the driver's door is opened unless the alarm system had been armed, as signified by FF1 and FF2 being set.

Flip flop FF2 is set approximately one minute after FF1 is set through the action of one minute timer R5, C5. More specifically, when FF1 is set, capacitor C5 begins to charge. When the voltage across capacitor C5 reaches the threshold of inverter 13, the output of the inverter goes low and this transition sets FF2. The resulting high level Q signal from FF2 resets flip flop FF3 as well as back-biasing diode CR 4 and priming NAND gate 15. If now the driver's door is opened, the low level applied to the top input of gate 14 results in a high output from that gate which charges capacitor C6 through resistor R7. The input to inverter 16 follows the voltage across capacitor C6, which voltage is not now clamped to a low level by diode CR4 because that diode is back-biased by the high Q signal from FF2. When the charge across C6 reaches the threshold of inverter 16 (nominally in about fifteen seconds), the output of inverter 16 goes low and diode CR5 begins to conduct and sets alarm flip flop FF4. Thus, entry into the vehicle via the driver's door after the alarm system is armed provides an approximate fifteen second delay before the alarm sounds. This delay permits the authorized vehicle operator to turn on the ignition and disarm the system by resetting flip flops FF1, FF2 and FF4 before the siren sounds. The high level appearing at the output of gate 14 immediately changes the state of gate 15 since both inputs to that gate are now high. The resulting low level output from gate 15 is applied to the bottom input of gate 14 to maintain the output from gate 14 high even if the driver's door is closed. Thus, during the fifteen second delay period after entry through the driver's door, the alarm cannot be thwarted merely by closing the driver's door; only closure of the ignition switch within fifteen seconds can prevent the alarm from sounding.

Diode CR9 is controlled by the primary vehicle intrusion sensing circuit which includes the circuitry associated with transistor Q2. Specifically, transistor Q2 is normally biased off (i.e.—non-conducting) by the series circuit comprising capacitor C9 and resistors R11 and R12. Capacitor C9 charges to the battery voltage B+ so that the junction between R11 and R12 (and hence the emitter of Q2) normally sit at ground. The base of Q2 is returned to ground through bias resistor R14. If any door other than the driver's door is opened, the vehicle dome light is energized, resulting in a transient appearing on the battery line. Actually, operation of any vehicle accessory which produces a transient voltage impulse reduction serves the same purpose. Since the voltage across capacitor C9 cannot change instantaneously, the negative transient on the line causes a small current through R11 and R12 which produces a short negative voltage pulse at the emitter of Q2. This causes Q2 to momentarily conduct, producing a negative-going transition at the S input of flip flop FF3 which is set thereby. The high Q level appears at FF3 to charge capacitor C7 through resistor R8. When the voltage across C7 reaches the threshold of inverter 17, the latter provides a low output level to permit diode CR9 to conduct. This in turn sets alarm flip flop FF4 to sound the siren. The time constant of R8 and C7 is very short, on the order of a few milliseconds, and provides a delay sufficient to prevent sounding of the alarm via FF3 in response to opening the driver's door. More specifically, the dome light is energized when the driver's door is opened and this produces a transient on the battery line which otherwise would gate Q2 on and set FF3 and FF4. However, as described above, upon opening of the driver's door it is intended that there be a delay of approximately fifteen seconds before the siren sounds to permit time for the authorized operator to disarm the system. To permit this delay to occur it is necessary to prevent FF4 from being set by FF3 in response to opening of the driver's door. To this end, capacitor C7 is shorted and prevented from charging by diode CR6 whenever the output of NAND gate 15 is low. That output, as described above, goes low after the driver's door is opened; at all other times it is high. Therefore, diode CR6 only prevents C7 from charging when opening the driver's door causes FF3 to set. Under such circumstances, if the ignition switch S3 is not actuated within approximately fifteen seconds, diode CR5 is rendered conductive, as described above, to set the alarm flip flop FF4.

The alarm circuit per se, when actuated by FF4 being set, remains actuated for two minutes or until the ignition switch S3 is turned on, whichever is shorter. Specifically, when FF4 is set, transistor Q3 is gated on to provide a ground return for timer circuit 21 and for the siren circuit 24 via contacts 22. The siren starts sounding immediately and the timer interval begins immediately. When the timer cycle elapses (nominally after two minutes), the timer armature is pulled down, breaking the ground return for siren circuit 24 and turning off the siren. On the other hand, if, before the timer cycles, FF4 is reset by ignition switch S3, transistor Q3 is turned off and the ground return for both the timer and siren is broken.

In the circuit described above, it is to be understood that it need not be the driver's door with which the alarm actuation delay is associated; rather, it may be any other means of entry, including any door, tailgate, hatch, etc. Further, as mentioned above, the arming meahcnism need not be a vehicle brake light but instead can be any electrical accessory. Still further, a separate sensor switch, similar to S2 for the hood, may be associated with the vehicle trunk, a tape deck, CB radio, or any other item or vehicle compartment where opening or removal can actuate a switch. It should also be noted that while the reset is conveniently achieved via a pole of the ignition switch S3, it is also within the scope of this invention for S3 to be a separate switch which is preferably but not necessarily key-actuated and which only the authorized operator of the vehicle could be expected to operate within the nominally fifteen second delay associated with switch S1. The various time delays and intervals described herein are believed suitable for the intended operation of the invention; however, these delays and intervals may be varied in accordance with the scope of the present invention.

By way of example only, the following is a table of component values for a preferred embodiment of the invention, it being understood that considerable variation is possible to still achieve the intended objectives of the present invention:

| Component | Value |
| --- | --- |
| R1, R19 | 3.0 K ohms |
| R2 | 150 K ohms |
| R3, R4, R6, R9, R15, R17, R20, R23 | 10 K ohms |
| R5, R7 | 470 K ohms |
| R8 | 100 K ohms |
| R10 | 100 ohms |
| R11, R12 | 220 ohms |
| R13 | 47 K ohms |
| R14, R16 | 1 K ohms |
| R18 | 470 ohms |
| C1, C7, C9, C11 | 1.0 uf |
| C2, C6 | 33 uf |
| C3, C4 | 0.1 uf |
| C5, C8 | 100 uf |
| C10 | .01 uf |
| C12 | 10 uf |

All transistors are 2N3904.
All diodes are 1N4001.

While we have described and illustrated one specific embodiment of our invention, it will be clear that variations of the details of construction which are specifically illustrated and described may be resorted to without departing from the true spirit and scope of the invention as defined in the appended claims.

We claim:

1. An intrusion alarm system for a vehicle having a plurality of doors for egress and ingress to a passenger compartment, said system comprising:
    an armable circuit;
    first circuit means responsive to momentary actuation of a predetermined accessory of said vehicle for arming said armable circuit;
    sensing means associated with each of said doors and responsive to opening of that door when said armable circuit is armed for providing an alarm actuation signal;
    alarm means responsive to alarm actuation signal for sounding an audible alarm signal;
    egress delay means responsive to arming of said armable circuit for establishing a first delay interval during which said alarm means is prevented from responding to intrusion into said vehicle to permit an authorized vehicle operator to egress from the vehicle;
    disarming means for permitting selective disarming of said armable circuit;
    ingress delay means responsive to said armable circuit being armed and to opening of only a predetermined one of said doors for establishing a second delay interval; and
    means for delaying sounding of said audible alarm signal during said second delay interval to permit an authorized operator of said vehicle to actuate said disarming means.

2. The system according to claim 1 further comprising:
    second circuit means responsive to opening of a compartment of said vehicle and said armable circuit being in its armed condition for actuating said alarm means, irrespective of said delay interval.

3. The system according to claim 2 wherein said compartment is an engine compartment of said vehicle.

4. The system according to claim 2 wherein said compartment is a storage compartment of said vehicle.

5. The system according to claim 1:
    wherein said armable circuit is a bistable circuit having a first stable state representing an armed condition and a second stable state representing a disarmed condition;
    wherein said first circuit means comprises:
        capacitive means;
        means for charging said capacitive means to a predetermined voltage;
        means responsive to actuation of said predetermined accessory for discharging said capacitive means according to a predetermined time constant; and
        means responsive to de-actuation of said predetermined accessory while the voltage across said capacitive means exceeds a pre-established threshold for switching bistable circuit to said first stable state; and
    wherein said disarming means includes means for switching said bistable circuit to said second stable state.

6. The system according to claim 1:

wherein said armable circuit is a bistable circuit having a first stable state representing an armed condition and a second stable state representing a disarmed condition;
wherein said first circuit means comprises:
  capacitive means;
  means for charging said capacitive means to a predetermined voltage;
  means responsive to actuation of said predetermined accessory for discharging said capacitive means according to a predetermined time constant; and
  means responsive to de-actuation of said predetermined accessory while the voltage across said capacitive means exceeds a pre-established threshold for switching bistable circuit to said first stable state.

7. The system according to claim 6 further comprising disarming means for permitting selective switching of bistable circuit to said first stable state.

* * * * *